W. B. CHAPMAN.
GAS PRODUCER.
APPLICATION FILED NOV. 23, 1908.

1,015,296.

Patented Jan. 23, 1912.
4 SHEETS—SHEET 3.

WITNESSES
E. J. McLaughlin
A. C. Abbott

INVENTOR
William B. Chapman
BY Isaac B. Owens
ATTORNEY

W. B. CHAPMAN.
GAS PRODUCER.
APPLICATION FILED NOV. 23, 1908.

1,015,296.

Patented Jan. 23, 1912.
4 SHEETS—SHEET 4.

UNITED STATES PATENT OFFICE.

WILLIAM B. CHAPMAN, OF NEW YORK, N. Y.

GAS-PRODUCER.

1,015,296.

Specification of Letters Patent. Patented Jan. 23, 1912.

Application filed November 23, 1908. Serial No. 464,150.

*To all whom it may concern:*

Be it known that I, WILLIAM B. CHAPMAN, of Brooklyn, city of New York, county of Kings, State of New York, have invented certain new and useful Improvements in Gas-Producers, of which the following is a full, clear, and exact specification, such as will enable others skilled in the art to which it appertains to make and use the same.

My invention relates to a producer which may be operated either on the suction or pressure principle for the production of power or fuel gases from bituminous coals. The invention resides in various features of structure and relative arrangement or combination of parts, all of which will be fully set forth hereinafter and particularly pointed out in the claims.

For the purpose of a detailed description, reference is had to the accompanying drawings which illustrate, as examples only, two preferable practical embodiments of the invention, though many and various modifications of the invention may be resorted to without departing from its principle as expressed in the claims, all of which will be apparent to persons skilled in the art.

Figure 1:
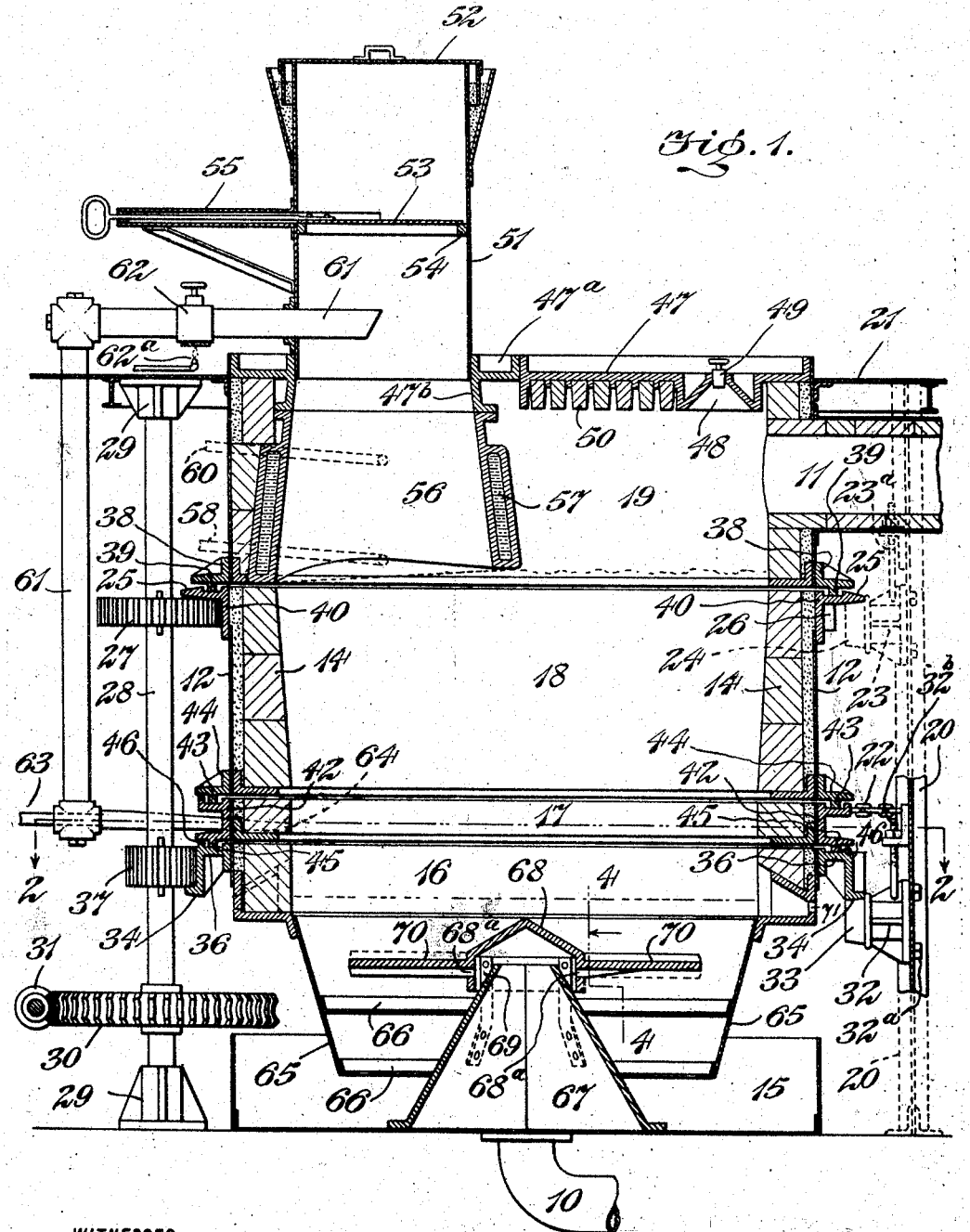
Figure 2:
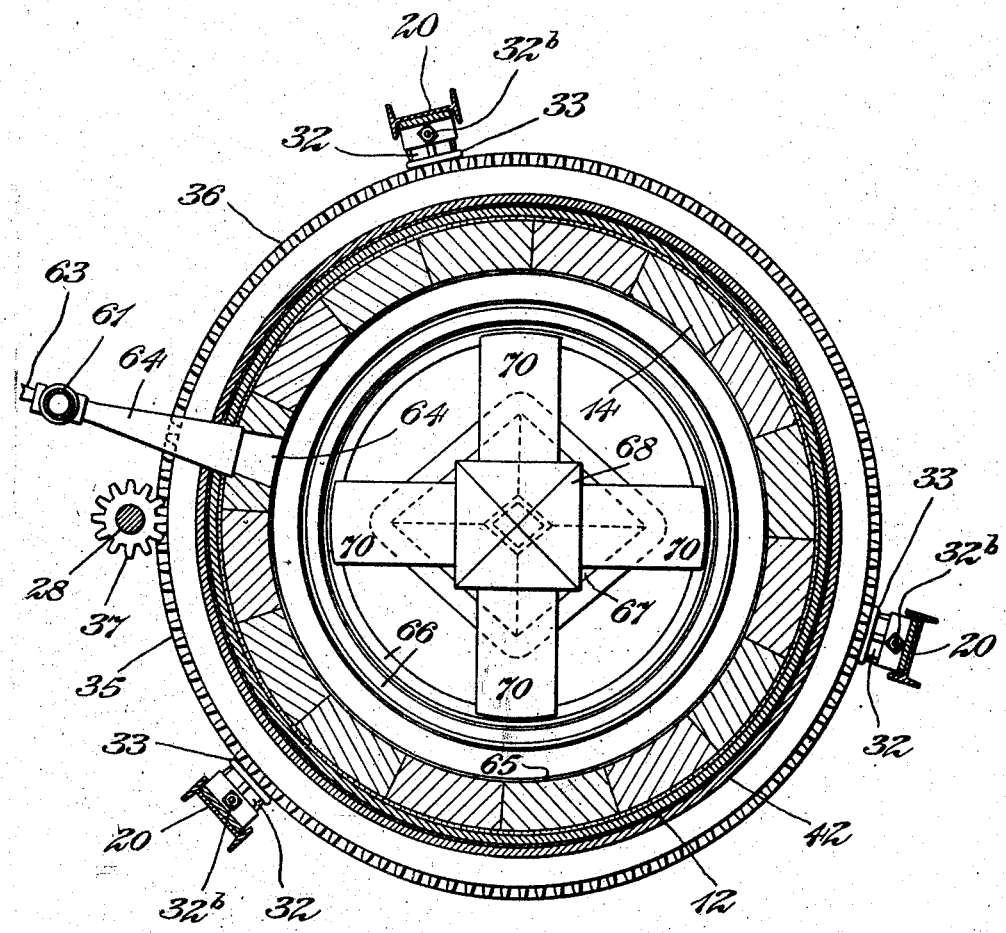
Figure 3:
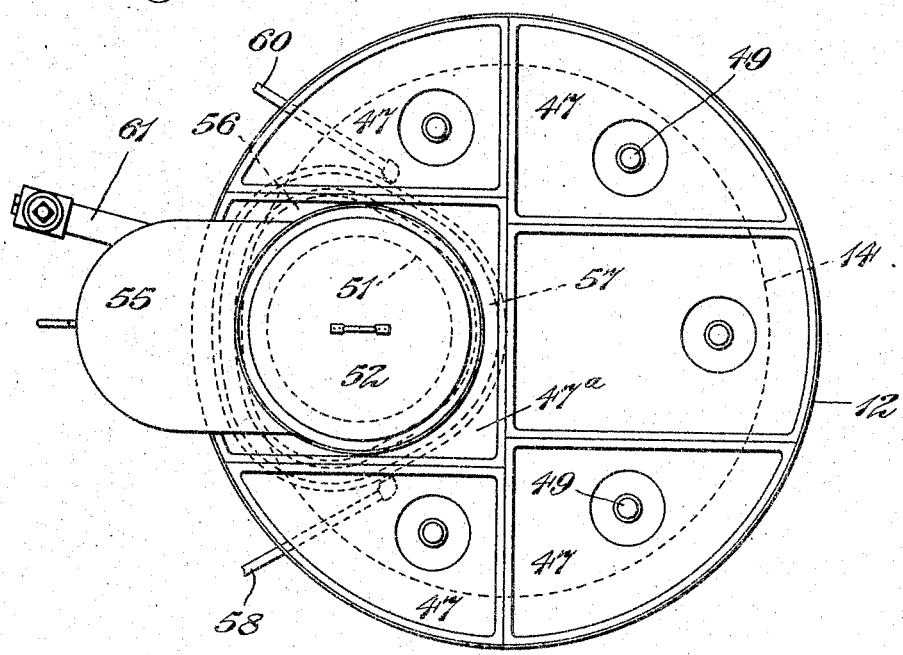
Figure 4:
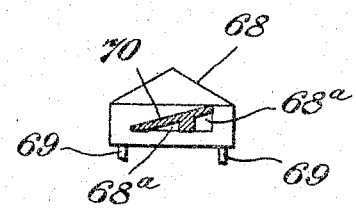
Figure 5:
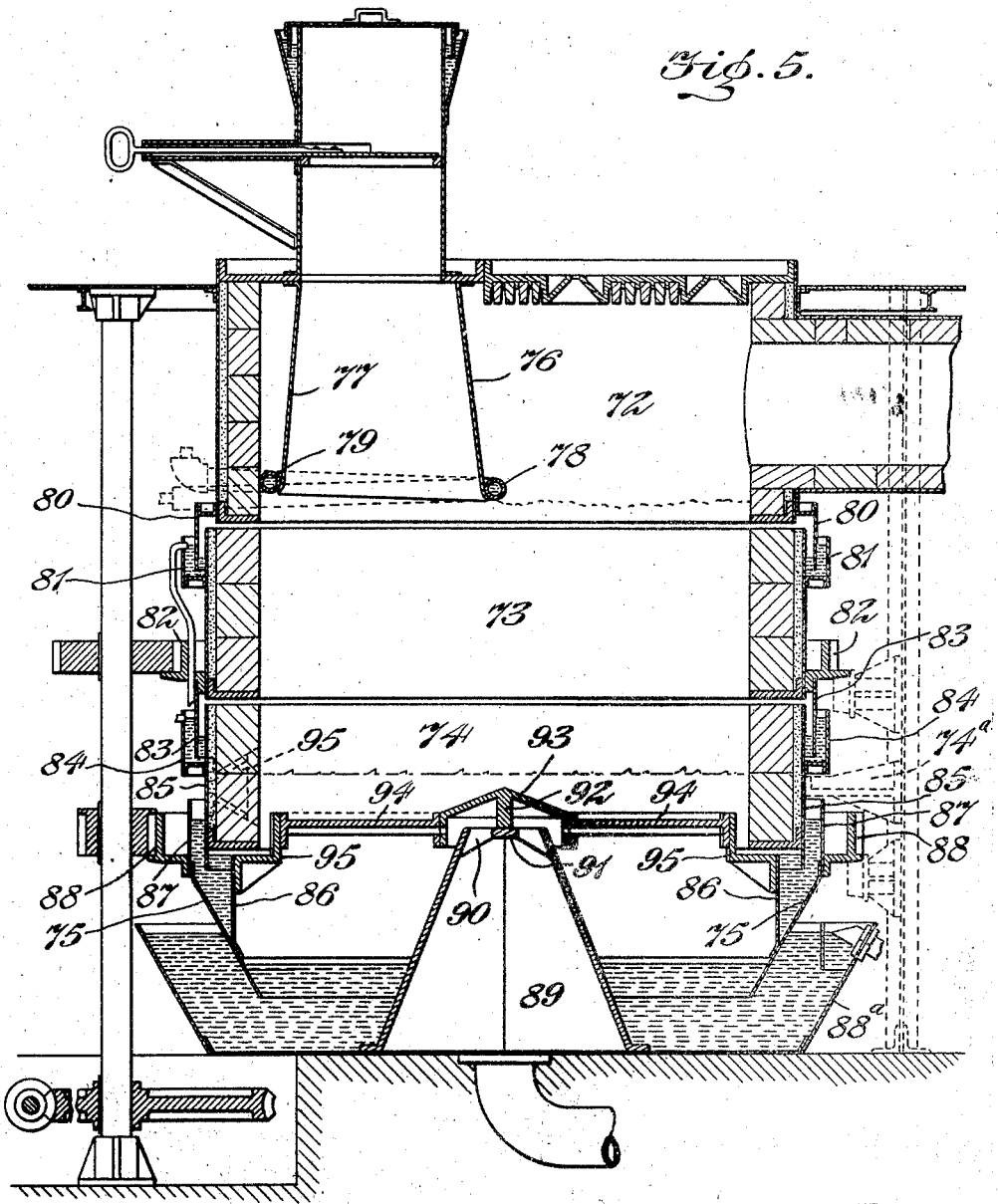

In said drawings—Figure 1 is a vertical section of the producer; Fig. 2 is a cross section thereof on the line 2—2 of Fig. 1; Fig. 3 is a plan view; Fig. 4 is a detailed section of one of the plows on the line 4—4 of Fig. 1; and Fig. 5 is a vertical section of a second form of the producer.

Referring first to the structure shown in Figs. 1 to 4; the producer there shown is especially, though not necessarily, designed as of the upright suction type, 10 being the air inlet to the bottom and 11 the gas outlet. The producer is illustrated as with a metal shell 12, and a fire brick or other refractory lining 14. At the base of the producer is an ash pan 15 above which is the body of the producer, the same being cylindrical in form and, in the type shown in Fig. 1, is composed of four superimposed sections 16, 17, 18 and 19. Of these sections, the lowermost, 16, and the upper intermediate, 18, are adapted to rotate around a vertical axis, while the remaining sections 17 and 19 are stationary. The lower stationary section 17 is comparatively narrow for a purpose which will fully appear hereinafter. The upper revolving section 18 is flared upward interiorly to cause the burning fuel to arch or cling therein to a certain extent and thereby insure that such fuel will rotate with the section 18. The upper stationary section 19 has its refractory lining of less thickness than that of the linings below since the heat is less severe at the top of the producer.

As shown in Fig. 2, three vertical I-beams 20 are erected around the body of the producer at equi-distant points and extend from the bed upward to the charging floor 21 which they assist in sustaining. The section 19 is attached to and sustained by the beams of the floor 21, and if desired, by brackets (not shown). The beams 20 also carry inwardly projecting studs 23 on which are mounted rollers 24 which bear under an annular flange 25 on a gear ring 26 encircling and attached to the upper rotating section 18. In this manner said section is sustained to rotate freely on the rollers 24. In mesh with the gear ring 26 is a pinion 27 fastened on a vertical shaft 28. This shaft is mounted at its ends in bearings 29 and has fastened to its lower portion a worm wheel 30 in mesh with a worm 31 mounted and driven in any desired manner. The beams 20 have a second set of studs 32, similar to the studs 23, and carrying rollers 33. These rollers are engaged by and support the flanged lower edge 34 of a gear ring 35 which is firmly joined to the section 16 through a web 36 thus mounting the lower rotating section. 37 indicates a pinion fastened to the shaft 28 and meshed with the gear ring 35 to rotate the section 16. The ratio of the gearing is such that the sections 16 and 18 turn at different speeds. The studs 32 are adjustably held by bolts 32ª and adjusted by screws 32ᵇ as shown. The weight of the section 17 is carried by the section 16 as will fully appear hereinafter and the section 17 is prevented from rotating by a lock chain 22 or other suitable means.

The edges of the sections of the body of the producer abut each other as closely as is possible in view of the necessary clearance as the drawings show and it is essential to provide at these points some form of a seal to prevent the leakage of gas or air between the sections. Heretofore this has been effected by water cups producing water seals, but this has many disadvantages among which are the use of water frequently at considerable cost, the danger of the water splashing out of the seals by the rolling and pitching of the vessel in the case of marine installations and the cost and difficulty of constructing proper seals, particularly in producers designed for the generation of what is known as water gas where high pressures are required. To obviate these difficulties I have devised a mechanical seal of two parts with relative sliding motion. To the lower edge of the section 19 is attached an annulus 38 preferably of cast iron with a depending bead 39, running in an annular groove 40 formed in the top of the flange 25. The bead 39 contacts with the bottom of the groove 40 and the flange 25 rotating with the section 18 slides under the bead, forming in this manner, a running or sliding joint the surfaces of which are, by the sliding motion, ground true and therefore made gas tight. If desired, a quantity of graphite may be placed in the groove 40 to lubricate the parts. The lower stationary section 17 has attached thereto a double flanged annulus 42, the upper flange of which is grooved to receive the bead 43 on an annulus 44 fastened to the lower edge of the upper rotating section, while the lower flange of the annulus 42 has a bead 45 fiting a groove 46 in the web 36 of the gear ring 35. In this manner seals similar to that first described are formed between the sections 18, 17 and 16. By adjusting the parts 32ª and 32ᵇ the elevation of the sections 16 and 17 may be controlled and the parts of the seals kept engaged with the proper pressure. The studs 23 are fitted with similar screws 23ª by which similar adjustment of the section 18 may be effected.

As shown in Figs. 1 and 3, the stationary top of the producer is formed of a number of sections 47 and 47ª of cast iron flanged and bolted together and with poke holes 48 therein. These poke holes are normally adapted to be closed by plugs 49 as shown in Figs. 1 and 3. On its under side the sections of the producer top excepting the section 47ª have attached a refractory lining 50, preferably formed in blocks over and between which the top is cast, thus furnishing a convenient means for attaching the lining. In the sections 47ª a circular opening is formed which receives the lower end of a charging hopper 51. The hopper has a water sea'd cover 52 at its top and at approximately its middle is located a gate 53 movable horizontally on a bead 54 in the hopper and adapted to be withdrawn to open position into an air tight casing 55 projecting from the side of the hopper.

The open bottom of the hopper communicates with a coking chamber 56 which is open at its bottom and extends downward eccentrically to and in the uppermost section, 19 of the producer to a point near the lower edge thereof. The coking chamber 56 is, according to the construction shown in Fig. 1, fastened to a depending flange 47ᵇ on the section 47ª of the producer top and formed with a water chamber 57. At its outer side the coking chamber is let into the refractory lining 14 and the lining ring.

58 and 60 indicate water inlet and outlet pipes through which water may be circulated in the chamber 57 to cool the walls of the coking chamber and prevent their destruction by the heat.

The lower edge of the coking chamber, as indicated by the dotted lines in Fig. 1, is inclined spirally and the upper rotating section 18 turned toward the lower portion of such edge. The result of this is that the coal in the producer, rising to the level indicated in Fig. 1, i. e. to the lower edge of the coking chamber, is moved against the lower portion of the edge of such chamber and rolled or dammed up against the same. This edge, therefore, serves to level off the top of the fuel and at the same time to effect a constant rolling agitation thereof, by which a caking or solidification of the top of the fuel bed is prevented. The opposite or higher portion of the edge of the coking chamber allows a certain quantity of fuel to be steadily drawn out of the coking chamber by the rotation of the section 18. In the operation of the producer, therefore, the body of glowing fuel is rotated under the eccentric open bottom coking or feed chamber with the result that a constant quantity of fuel is uniformly fed from such chamber and uniformly distributed over the fuel bed, while the surface of such bed is constantly harrowed or agitated as explained. To fill the coal magazine or hopper the cover 52 should be removed, the gate having first been closed. The hopper may then be filled above the gate without escape of gas, after which, upon replacing the cover 52, the gate may be opened to allow the coal to drop into the coking chamber and a second charge of coal introduced by again closing the gate and removing the cover. Normally, however, the gate should be kept withdrawn into the casing 55 to protect the gate from the heat.

When in operation, the heat generated in the body of the producer acts on the coal in the coking chamber in such a way as to drive off therefrom the more volatile of its gaseous constituents in the form of a rich heavy gas having a high percentage of tar and other bituminous substances. According to my invention this tarry gas is conducted around into the body of incandescent fuel where it is acted on by the incandescent carbon and transformed into a fixed gas which may be readily washed and cleansed to prepare it for use in gas engines if desired. To this end I lead from the charging hopper a horizontally disposed pipe 61 which turns downward and extends to the narrow section 17 of the producer and terminates in a duck-bill nozzle 64 which extends through the walls of the section 17 and discharges into the producer. 63 indicates a steam or other fluid jet nozzle discharging into the lower end of the by-pass pipe 61 to induce a current therein; and 62 indicates an air valve in the receiving end of the pipe by which air may be introduced into the gas therein and which when open will allow of igniting the mixture thus formed. By these devices should any of the tarry gas condense in the pipe 61 leaving a tar and soot deposit, the same may from time to time be burned out from the pipe, thereby keeping the pipe clear of all such accumulation.

62ª indicates a flame for igniting the gas as described.

The operation of the producer causes the body of incandescent coal in the section 18 to rotate past the point of inlet of the gas from the nozzle 64, thereby thoroughly agitating the fuel and instantly breaking down or closing any blow holes, channels or "chimneys" which might form or start to form by reason of the blast of gas from the nozzle 64. Further, the duck-bill form of the nozzle and the location of the coking chamber above it, tend to diffuse the gas through the entire mass of coal and prevent it from passing along a fixed path, which, if such path were followed, would result in forming a blow hole up through the fuel bed. Since a solid or compact fuel bed is essential to good results, it follows that the breaking down of blow holes is of the greatest importance.

The lower rotating section 16 has an inverted frusto-conical skirt 65 attached to its bottom edge and projecting downward into the ash pan 15. This skirt is provided with horizontal internal ribs 66, here shown as two in number, which extend around the skirt and partly support the ash inclosed by the same. These ribs serve also to reinforce the skirt. Consequently as the skirt revolves with the producer section 16, this body of ash is carried around with it. Over the inlet pipe 10 is arranged a tapering nozzle or ash crusher 67 mounted on the bottom of the pan 15 and square or lozenge shaped in cross section as indicated in Fig. 2. This crusher nozzle 67 may be of any angular form or it might be round and eccentrically located in the ash pan without materially affecting its operation. The nozzle 67 is crowned by a pyramidal hood 68 rigidly mounted on the nozzle by brackets 69 and projecting downward over and below the open upper end of the nozzle. Integral with the hood are a number, preferably four, of horizontally disposed plow arms 70 with inclined upper faces and longitudinally ribbed under faces as shown in Fig. 4. These plows project radially toward the skirt 65 and as the ash is rotated by the same it is moved against the plows which thoroughly agitate the ash, breaking the clinkers into such size as to render their removal easy and not interfere otherwise with the effective operation of the apparatus. The sides of the hood under the plows are formed with air outlet openings 68ª through which a large part of the air supply escapes and is conducted along the under sides of the plows to the outer portion of the producer. By this arrangement I am enabled to employ a hood of small diameter and yet to spread out and distribute the draft evenly throughout the entire fuel bed.

The ash is rotated toward the lower edges of the inclined upper surfaces of the plows and the plows therefore exert an upward thrust on the ashes above them, the result of which is not only to agitate the ash but to communicate the agitation in undulatory or wave-like form to the fuel bed above the ash. In this manner the fuel bed is agitated by agitating means located in the ash zone and which therefore do not require to be water or otherwise cooled. The lozenge shaped or other angular pyramidal nozzle 67 coacts with the rotating section 16 and skirt 65 by reason of the rotation of the ash bed around the nozzle, engaging the ash with the angular inclined sides of the nozzle and permitting ash to work downward in the gaps or recesses formed behind the ridges of the nozzle and forcing the ground up ash outward toward the edge of the pan. From this point the ash may be easily shoveled out of the pan by an attendant.

In the operation of the producer the bottom is first filled with ashes to a level above the plows and a fire is kindled on the ashes. The fuel is charged into the producer on the fire thus formed and the fuel supply continued as the fire spreads until the fuel rises to the normal level indicated in Fig. 1. The ash settles in the pan 15 and skirt 65 until the operation assuming its normal condition, the ash and fuel zones take approximately the elevations indicated in Fig. 1. Owing to the ratio of the driving gears the producer sections 16 and 18 rotate at different speeds, or if desired in opposite directions and as a result the upper part of the fuel bed in the section 18 is twisted with respect to the lower part in the stationary section 17 and the diversely rotating section 16. This thoroughly agitates and shakes down the mass of glowing coal, packing and uniformly distributing it and destroying in their inception any blow holes or "chimneys" which may tend to form. The agitating action is assisted by the motion of the ash against the plows which, as explained, causes an undulatory upward thrust to be exerted through the ash to the fuel. By these combined operations a solid uniform fuel bed is formed and maintained and the ash is constantly worked downward and outward to the edges of the pan 15.

The charging hopper and coking chamber should be kept filled with coal as explained; and as the fuel bed is rotated, with the section 18 under the coking chamber, the fuel is continually fed to the producer and kept evenly distributed over the whole surface of the fire. The rich tarry gas given off in the coking chamber is drawn therefrom by the jet from the nozzle 63 and forced down into the lower part of the fuel bed. From this point it rises through the continuously moving and agitated mass of incandescent fuel diagonally upward to the outlet 11, transformed during its passage into a permanent gas of such composition that it may be easily washed and cleansed and fitted for power purposes. The position of the ash line may be observed through peek holes 71 in the lowermost section 16. If at any time necessary, the fire may be hand poked through the poke holes 48 in the producer tops.

In connection with the operation of the producer, it may be remarked that the speed of rotation of the sections 16 and 18 is comparatively slow, varying from approximately one to two revolutions per hour. Hence, very little power is required for this purpose. The rich, tarry gas from the coking chamber is forced through the hottest portion of the continual twisting fire and is thus converted into a clean fixed gas, effecting a great saving in heat units when compared with the old system of washing out and wasting this bituminous element. It is further to be pointed out that the gas by-passed into the fire is introduced above the air inlet and does not, therefore, combine directly with the air. This avoids burning the gas and insures that it is properly subjected to the action of the incandescent carbon.

The construction shown in Fig. 5 is of the up-draft pressure principle and differs from the construction above described principally in the form of the seals and ash plow, the omission of the by-pass from the coking chamber and certain changes in the construction of such chamber. In Fig. 5, 72 represents the stationary top section, 73 the upper rotating section, 74 the lower stationary section and 75 the lower rotating or ash section. The three upper sections are brick lined and cylindric in form and the lowermost section 75 is here shown as of sheet metal and of inverted frusto conical form. The rotating sections are mounted and driven substantially as hereinbefore described with reference to Figs. 1 to 4 except that the section 74 is sustained by brackets 74ᵃ. The charging hopper with its gate and cover are also unchanged with reference to Figs. 1 to 4. The down draft by-pass from the coking chamber is omitted from the modified type of producer. The coking chamber instead of being formed of an integral water chambered casting is formed of two metal sheets 76 and 77, the former substantially V or V-shaped with its vertical edges fastened to the wall of the section 72 and the latter extending across between the sides of the former to prevent contact of the coal with the brick lining of the producer and the consequent clinging or "hanging up" of the coal in the coking chamber. The lower edge of the sheet 76 is strengthened and protected from the heat by a V or V-shaped water pipe 78 to which it is attached, while the lower edge of the sheet 77 is protected by a branch pipe 79 extending across between the limbs of the pipe 78.

The producer sections are watersealed between each other in Fig. 5. The top section 72 has a depending skirt 80 at its lower edge which dips into an annular cup 81, both parts encircling the producer and constituting a seal between the sections 72 and 73 maintained at all times irrespective of their relative motion. The gear ring 82 of the section 73 carries a skirt 83 and this projects down into an annular cup 84 attached to the upper part of the section 74, producing a similar seal at this point. From the lower edge of the section 74 the sheet metal wall 85 projects downward into an annular cup formed by two annular walls 86 and 87 of which the latter is an extension of the section 75 and the former rises from the said section at an acute angle thereto. The gear ring 88 of the section 75 is attached to and encircles the wall 87. 88ᵃ indicates the ash pan which is adapted to be filled with water and into which the section 75 dips. In the center of the ash pan 88ᵃ and over the air inlet is arranged an air nozzle 89 which serves the additional function of an ash or clinker crusher, the same as in Figs. 1 to 4. The nozzle 89 tapers upwardly and is of square, lozenge-shaped or other angular cross sectional form so that the ash bed revolving with the section 75 is carried against the angular sides of the nozzle and the clinkers are broken into small sections which may be readily removed with the ash. The form of the nozzle and the rotation of the ash also serves to work the ash down and outward in the pan, as hereinbefore described. In the upper end of the nozzle 89 is a spider 90 supporting a step 91 on which bears a stud 92 projecting down from the under side of the nozzle hood 93. The upper surface of this hood is pyramidal in form and from the hood ash plows 94 project. The hood 93 and plows 94 are similar to the plows of Figs. 1 to 4 except that the plows extend over to brackets 95 attached to the wall 86 of the lower rotating section, and are joined thereto so that the hood and plows turn with such section. The gear ring 88 serves to support the plows and hood and prevent sagging thereof, while the motion of the plows and hood and their peculiar formation causes a thorough agitation of the ash settling the same and breaking the clinkers. Further these elements exert an undulatory upstroking action which is communicated through the ash to the fuel bed as before described. It will also appear from Fig. 5 that the nozzle 89 and plows 94 are higher in the producer than in the other form and thus exert a greater rotating action on the ashes.

The operation of the form of producer shown in Fig. 5 is essentially the same as that of the producer shown in Figs. 1 to 4, excepting for the change in the nature of the draft and the omission of the by-pass from the coking chamber. The ash plows in Fig. 5 revolve with the lower rotating section and work against the ash in the lower part of the section 74, this being in a broad sense a mere reversal of the arrangement shown in the other figures. The operation may be observed from time to time through peek or test holes 95ᵃ in the section 74.

While I have shown my invention embodied in a gas producer it will be plain to persons skilled in the art that many of its features may be adapted to other arts, among which may be mentioned blast furnaces, without departing from the spirit of the invention or sacrificing any of its advantages.

Having thus described my invention, what I claim as new and desire to secure by Letters Patent is:

1. A gas producer, having a stationary top portion, a rotating section below it adapted to carry burning fuel, a charging hopper in the upper portion of the producer, the bottom of the hopper being open so that its contents may rest superimposed on the fuel in the rotating section, a stationary section below the rotating section, a second rotating section below the stationary section, the second rotating section carrying the ashes a plowing means located in the ash zone, said plowing means serving, through the ash, to agitate the lower part of the burning fuel, an ash pan below the lower or second rotating section, a nozzle standing in the pan and rising into said second rotating section and to which nozzle the plowing means are immovably attached, horizontally disposed ribs in the lower rotating section to assist in sustaining the ashes therein, means for drawing off the gases generated in the charging hopper and by-passing such gases to the interior of the producer through the second named stationary section and seals between the relatively moving section formed of members in sliding contact with each other.

2. A gas producer, having a stationary top portion, a rotating section below it adapted to carry burning fuel, a charging hopper in the upper portion of the producer, the bottom of the hopper being open so that its contents may rest superimposed on the fuel in the rotating section, a stationary section below the rotating section, a second rotating section below the stationary section, the second rotating section carrying the ashes, a plowing means located in the ash zone, said plowing means serving, through the ash, to agitate the lower part of the burning fuel, an ash pan below the lower or second rotating section, a nozzle standing in the pan and rising into said second rotating section and to which nozzle the plowing means are immovably attached and horizontally disposed ribs in the lower rotating section to assist in sustaining the ashes therein.

3. A gas producer having a stationary top portion a rotating section below it adapted to carry burning fuel, a charging hopper in the upper portion of the producer, the bottom of the hopper being open so that its contents may rest superimposed on the fuel in the rotating section, a stationary section below the rotating section, a second rotating section below the stationary section, the second rotating section carrying the ashes, a plowing means located in the ash zone, said plowing means serving, through the ash, to agitate the lower part of the burning fuel and horizontally disposed ribs in the lower rotating section to assist in sustaining the ashes therein.

4. A gas producer, having a stationary top portion, a rotating section below it adapted to carry burning fuel, a charging hopper in the upper portion of the producer, the bottom of the hopper being open so that its contents may rest superimposed on the fuel in the rotating section, a stationary producer section below the rotating section, a second rotating section below the stationary section, the second rotating section carrying the ashes and a plowing means located in the ash zone said plowing means serving, through the ashes, to agitate the lower part of the burning fuel.

5. A gas producer, having a body formed of a stationary top section, an upper rotating section, a lower stationary section and a lower rotating section, a crusher nozzle projecting upward into the lower rotating section, a stationary plow sustained by the nozzle, whereby the ashes moving with the lower rotating section are caused to exercise an agitating action on the lower part of the burning fuel above, a charging hopper carried by the stationary top section and open at its bottom so that the fuel supply may bear on the burning fuel and means for bypassing the gases generated in the charging hopper to the interior of the body of the producer at the lower stationary section.

6. A gas producer having a shell including two superposed sections, one of which is stationary and the other of which is movable relatively to the stationary section, the upper of said sections having a depending wall forming with the walls of the section, a coking chamber and an outlet chamber each opening at the bottom of the section, means whereby fuel may be charged into said coking chamber and means whereby the gas generated within said coking chamber is caused to flow through the incandescent fuel in the lower chamber on its way to said outlet chamber.

7. A gas producer having a shell including two superposed sections, the upper of which is stationary and divided by a downwardly projected partition into a distillation chamber and an outlet chamber the lower of which is rotatable in respect to the upper section, a gas tight seal between said sections and means for causing the gas generated in said distillation chamber to flow through the fuel in the lower section to the outlet chamber.

8. A gas producer having an upper stationary section divided by a downwardly projected partition into a fuel supply chamber and a gas outlet chamber communicating with each other through the lower section and beneath said partition, means whereby fuel may be charged into said fuel supply chamber, means whereby gas may be drawn off from said outlet chamber and means for moving said lower section in a horizontal plane relatively to the upper section.

9. In a gas producer, means for retaining a mass of burning fuel, means for retaining a mass of fuel supply directly supported by the burning fuel and of smaller cross-sectional area and means for causing motion of the burning fuel bodily past the unburned fuel supply to distribute the fuel supply over the burning fuel.

10. In a gas producer, means for retaining a mass of burning fuel, means for retaining a mass of fuel supply directly supported by the burning fuel and means for imparting bodily rotation to the burning fuel, said fuel supply being eccentric to the center of rotation of the burning fuel whereby the fuel supply is distributed over the surface of the burning fuel.

11. A gas producer having a stationary top section, a rotating section below it adapted to carry burning fuel and a charging hopper in the upper portion of the producer, the bottom of the hopper extending below the top of the producer and being disposed eccentrically of the rotating section and open so that its contents may rest directly upon the fuel in the rotating section and maintain the upper surface of said last-mentioned fuel substantially level.

12. A gas producer having a stationary top portion, a rotating section below it adapted to carry burning fuel and a charging hopper in the upper portion of the producer, the bottom of the hopper extending down below the top of the producer and being disposed adjacent one side of the rotating section and open so that the contents may rest directly upon the fuel in the rotating section and maintain the upper surface of said last-mentioned fuel substantially level.

13. A gas producer having a stationary top portion, a rotating section below it adapted to carry burning fuel, a charging hopper in the upper portion of the producer, the bottom of the hopper being open so that its contents may rest superimposed on the fuel in the rotating section, said hopper being located eccentrically to the center of rotation of the rotating producer section and means for driving the rotating section, such driving means located at the side adjacent to the charging hopper.

14. A gas producer having a stationary top portion, a rotating section below it adapted to carry burning fuel and a charging hopper in the upper portion of the producer, the bottom of the hopper being open so that its contents may rest directly superimposed on the main body of the fuel in the rotating section, the lower edge of the hopper being higher at one side than at the other and such rotating section moving the top of the burning fuel toward the lower side of such edge.

15. A gas producer having a stationary top portion, a rotating section below it adapted to carry burning fuel, a charging hopper in the upper portion of the producer, the bottom portion of the hopper being open so that its contents may rest directly superimposed on the main body of the fuel in the rotating section and said bottom portion formed with a water chamber for the purpose specified.

16. A gas producer having a moving section adapted to carry burning fuel and a relatively stationary part extending approximately from the center to one side at the top surface of such fuel against which the top portion of the fuel is moved by the moving section to agitate the surface of the fuel and prevent caking thereof.

17. A gas producer having a rotating section adapted to carry burning fuel and a relatively stationary part extending approximately from the center to one side at the top surface of such fuel against which the top portion of the fuel is moved by the rotating section, to agitate the surface of the fuel and prevent caking thereof.

18. A gas producer having a rotating section adapted to carry fuel and a relatively stationary part at the top surface of such fuel against which the top portion of the fuel is moved by the rotating section, to agitate the surface of the fuel and prevent caking thereof, such relatively stationary part located eccentrically to the center of movement of the rotating section.

19. A gas producer having means for maintaining a mass of burning fuel, means for effecting movement of one portion of said mass bodily in respect to another portion of the burning fuel, means for maintaining a fuel supply superimposed on said burning fuel and means for by-passing the gases generated within the fuel supply into the body of the burning fuel.

20. A gas producer having means for maintaining a fuel supply in proximity to the burning fuel, means for by-passing the gases generated at the fuel supply into the body of the burning fuel and means for agitating the burning fuel adjacent to the point of introduction of such gases.

21. A gas producer, having means for maintaining a fuel supply in proximity to the burning fuel, means for by-passing the gases generated at the fuel supply into the body of the burning fuel and means for twisting or relatively rotating the burning fuel at a point adjacent to the point of introduction of such gases.

22. A gas producer having two rotating body sections between which a stationary body section is interposed, means for maintaining a fuel supply superimposed on the burning fuel in said body sections and means for by-passing the gases generated at the fuel supply into the body of the producer through the walls of such intermediate stationary section.

23. A gas producer having body sections of which one is movable relatively to the other and a seal between them comprising members in sliding contact with each other.

24. A gas producer having body sections of which one is movable relatively to the other and a seal between them comprising members in sliding contact with each other such members projecting outward from the body of the producer removed from the heat hereof.

25. A gas producer having body sections of which one is rotatable relatively to the other and means forming a seal between them comprising members in sliding contact with each other.

26. A gas producer having body sections of which one is rotatable relatively to the other and a seal composed of parts respectively attached to such body sections and contacting with each other.

27. A gas producer having body sections of which one is movable relatively to the other and a seal between such sections comprising parts one of which has a bend in sliding contact with a wall of a groove in the other part.

28. A gas producer having body sections of which one is rotatable relatively to the other and a seal between such sections composed of members respectively attached to such body sections and contacting with each other, one of said members having a groove receiving a bead on the other member.

29. A gas producer having body sections of which one is rotatable relatively to the other, and a dry seal between the said sections composed of members respectively attached to said body sections and contacting with each other, the lower one of said sections having a groove and the upper one of said sections having a bead receiving within said groove.

30. A gas producer having a stationary body section, a rotatable body section below it, a gear ring attached to the rotatable section, a driving gear meshed therewith, a flange projecting from the gear ring, a sustaining means engaged by the flange and a flange attached to the stationary section and having a part in sliding engagement with the said flange of the gear ring to seal the two sections.

31. A gas producer having a stationary body section with revoluble sections above and below it, a double flanged annulus attached to the stationary section, a sustaining means attached to the annulus, a gear ring attached to the lower rotating section, a driving gear meshed therewith, a sustaining means on which the gear ring runs, the gear ring and the lower flange of the annulus having contacting surfaces to seal the stationary and lower rotating sections, a flange projecting from the upper rotating section and having a surface in contact with the upper flange of the annulus to seal the upper rotating and stationary sections, and means for driving the upper rotating section.

32. A gas producer having means for maintaining a fuel supply in proximity to the burning fuel and means for by-passing the gases generated at the fuel supply into the body of the burning fuel and means for burning out the accumulations of soot and the like in such by-pass.

33. A gas producer having means for maintaining a fuel supply in proximity to the burning fuel and means for bypassing the gases generated at the fuel supply into the body of the burning fuel and means for burning out the accumulations of soot and the like in such by-pass, comprising a valve commanding an opening in the by-pass through which air may be introduced to form with the gas therein a combustible mixture.

34. A gas producer having a stationary body-section and a rotary body section sustaining it.

35. A gas producer having a stationary body-section, a rotary body section sustaining it and a seal between the body sections comprising two parts having sliding engagement with each other.

36. A gas producer having a stationary body-section, a rotary body section sustaining it, a seal between the body sections comprising two parts having sliding engagement with each other, a rotary body section above the stationary section and a seal between the stationary section and the second named rotary section.

37. A gas producer having a stationary body-section, a rotary body-section sustaining it and articulated means for preventing rotation of the stationary section.

38. A gas producer having a stationary charging floor, vertical beams grouped around the body of the producer to sustain it, said body having a rotating section, a vertical shaft disposed adjacent said body and having its upper end journaled in said charging floor and means for transmitting motion from said shaft to said rotating body section.

39. A gas producer having a stationary charging floor, vertical beams grouped around the body of the producer to sustain said floor, said body having a rotating section, a vertically disposed shaft adjacent said body and having its upper end journaled in said charging floor and means independent of said beams for transmitting motion from said shaft to said rotating section.

40. In a producer gas apparatus, a bi-part shell consisting of two superposed sections, the upper of which is stationary and divided by a downwardly projecting partition into a distillation chamber, and an outlet chamber communicating with each other through the lower section and beneath said partition, and is provided with means whereby fuel may be charged into said distillation chamber, and means whereby gas may be withdrawn from said outlet chamber, and the lower of which has an open bottom and is constructed to be rotated, a gas tight seal between said sections, and means for rotating said lower section.

41. In a producer gas apparatus, a bi-part shell consisting of two superposed sections, the upper of which is stationary and divided by a downwardly projecting partition into a distillation chamber, and an outlet chamber communicating with each other through the lower section and beneath said partition, and is provided with means whereby fuel may be charged into said distillation chamber, and means whereby gas may be withdrawn from said outlet chamber, and the lower of which has an open bottom and is constructed to be rotated, a gas tight seal between said sections, means rotating said lower section, and a twyer projecting through the open bottom of and into said lower section.

42. A gas producer having a substantial cylindrical wall or shell sub-divided horizontally into three sections, each two adjacent ones of which have one movable relatively to the other, said sections serving to retain the incandescent portion of the fuel, the center one of which is comparatively narrow and the lower one of which has a downwardly extending inwardly converging flange constituting the ash holder, an air delivery nozzle within said lower section and means for delivering fuel to the upper of said sections and distributing it over the surface of the incandescent fuel.

43. A gas producer having a substantial cylindrical wall or shell sub-divided into three sections for jointly retaining the incandescent portion of the fuel, said sections being alternately arranged stationary and movable, the center one of said sections being comparatively narrow and the lower one of said sections having a downwardly extending flange constituting an ash holder, and an air delivery nozzle extending up into the lower section and terminating in a hood below said center section.

44. A gas producer having a shell sub-divided into two sections, one of which is movable relatively to the other, the lower one of which serves to retain a mass of burning fuel and the upper of which has means for retaining a mass of fuel supply directly over and supported by a portion only of the burning fuel at one side of the center thereof, means for effecting a gas tight seal between said sections and means for moving one of said sections in a horizontal plane relatively to the other.

45. A gas producer having a shell sub-divided into two sections, one of which is movable relatively to the other, the lower one of which serves to retain a mass of burning fuel and the upper of which has means for retaining a mass of fuel supply directly over and supported by a portion only of the burning fuel at one side of the center of rotation, means for effecting a gas tight seal between said sections and means for rotating one of said sections in respect to the other.

46. A gas producer having a substantially cylindrical wall or shell sub-divided into three sections for jointly retaining the incandescent portion of fuel, said sections being alternately arranged stationary and movable and the lower one of said sections converging toward its lower end and constituting an ash holder.

47. A gas producer having a substantially cylindrical wall or shell sub-divided into three sections for jointly retaining the incandescent portion of the fuel, said sections being alternately arranged stationary and movable and the center of one of said sections being comparatively narrow, an ash support beneath the lower section and an air delivery nozzle extending up into the lower section and terminating below said center section.

48. A gas producer having a substantially cylindrical wall or shell sub-divided into three sections for jointly retaining the incandescent portion of the fuel, each two adjacent sections having one movable relatively to the other and the center one of said sections being comparatively narrow whereby a horizontal movement of one part of the incandescent portions of the fuel in respect to the adjacent part is effected substantially in two adjacent planes.

In testimony whereof I have signed my name to this specification in the presence of two subscribing witnesses.

WILLIAM B. CHAPMAN.

Witnesses:
 ISAAC B. OWENS,
 RANDOLPH OWENS.